United States Patent [19]

Lambrechts et al.

[11] 4,322,322

[45] Mar. 30, 1982

[54] METHOD FOR PREPARING A WATER-CONTAINING VINYL ACETATE POLYMER DISPERSION, DISPERSION THUS PREPARED AND PROTECTIVE COLLOID USED THEREBY

[75] Inventors: Peter F. T. Lambrechts, Mechelen; Jozef H. R. Van Der Meeren, Borsbeke, both of Belgium

[73] Assignee: "Graanderivaten Raffinaderijen Amylum", in het kort: "G.R. Amylum", Vroeger Glucoseries Réunies Genoemd, Sint-Jans-Molenbeek, Belgium

[21] Appl. No.: 161,360

[22] Filed: Jun. 20, 1980

[30] Foreign Application Priority Data

Jul. 3, 1979 [BE] Belgium .................................. 57921

[51] Int. Cl.³ ............................................. C08L 3/04
[52] U.S. Cl. .................................... 524/734; 524/832
[58] Field of Search .............. 260/17.4 ST, 29.6 WA; 526/200

[56] References Cited

U.S. PATENT DOCUMENTS 3,769,248 10/1973 Kovats ........................ 260/17.4 ST
3,879,365 4/1975 Greminger ........................ 526/200

*Primary Examiner*—Paul R. Michl
*Attorney, Agent, or Firm*—Stevens, Davis, Miller & Mosher

[57] ABSTRACT

For preparing a water-containing vinyl acetate polymer dispersion, vinyl acetate monomer and initiator are added to a water solution from an emulsifier and hydroxypropyl starch and/or hydroxyethyl starch. The emulsifier amount is equal to 0,5 to 5 weight % from the monomer amount. The degree of substitution of the starch is higher than 0,8 substituted glucose hydroxyl groups per anhydroglucose unit and lies more specially between 0,8 and 1,8 substituted glucose hydroxyl groups per anhydroglucose unit, when the starch is hydroxypropyl starch or between 0,8 and 2,75 substituted glucose hydroxyl groups per anhydroglucose unit, when the starch is hydroxyethyl starch.

5 Claims, No Drawings

METHOD FOR PREPARING A WATER-CONTAINING VINYL ACETATE POLYMER DISPERSION, DISPERSION THUS PREPARED AND PROTECTIVE COLLOID USED THEREBY

BACKGROUND

This invention pertains to a method for preparing a water-containing vinyl acetate polymer dispersion, which comcomprises adding vinyl acetate monomer and an initiator to a water solution from an emulsifier and hydroxypropyl and/or hydroxyethyl starch.

Said substituted starch acts as protective colloid.

The preparing of dispersions from homo- and copolymers of vinyl acetate are already long known.

Said dispersions are notably used as adhesives in the wood and paper industries, in coatings for paper, in the paint industry and as reinforcing for book backs.

To prepare such dispersions there is started with a water phase wherein an emulsifier, a salt as buffer and generally also a protective colloid are dissolved or dispersed and with a monomer or a monomer mixture.

The water phase is heated to the polymerizing temperature and some initiator is added.

After some time, long enough to let said initiator form radicals, monomer is added.

After completing the addition, post-heating is performed during one to two hours. The reaction mixture is cooled and possibly filtered. The dispersions or latexes have generally a content in dry material from 48 to 65% based on the total weight but dispersions with a lower content in dry material can also be prepared in this way.

The polymerizing reaction of vinyl acetate follows a free-radical mechanism. The radicals are provided by the heat-decomposition from an initiator, for example potassium, persulphate, ammonium persulphate or organic peroxides.

A protective colloid is possibly used for preparing such dispersions. Protective colloids increase the viscosity and thus act as thickening agents. They further increase the stability of said emulsion during the reaction and thus oppose coagulating or flocculating. The protective colloids increase after the reaction, the mechanical stability of the dispersion or latex and thus oppose coagulating or flocculating during conveying, storing or further treatment. The protective colloids also increase the freezing-thawing stability and the general stability of the dispersion.

Besides substituted starch, the following are further used up to now as protective colloids: partly or completely hydrolyzed polyvinyl alcohols, natural and synthetic gums and cellulose ethers, such as hydroxyethyl cellulose and hydroxyethyl-methyl cellulose.

All of the above products are water-soluble and give viscous solutions which act as colloidal media.

The polyvinyl alcohols have the drawback of not being resistant in the presence of borax. Natural and synthetic gums are expensive and are of varying quality depending on the origin thereof. The cellulose ethers precipitate by heating at a temperature which is dependent on the product, from the dispersion they are absorbed in.

Starch derivatives have the advantage not to precipitate by heating from the solutions thereof and to be resistant in the presence of borax.

The use of starch derivatives and notably of hydroxypropyl and hydroxyethyl starch as protective colloids for the preparation of dispersions from homo- and copolymers of vinyl acetate is known from U.S. Pat. No. 3,769,248. It has been proposed therein to use starch derivatives with a degree of substitution from 0.05 to 0.75 hydroxyethyl or hydroxypropyl groups per anhydroglucose unit.

From the embodiment examples in the above Patent there further appears that the dispersion preparation requires a large amount from emulsifier. It did now surprisingly appear that by using substituted starch with another degree of substitution as defined hereinafter, the optimum protecting and thickening action of the starch derivates occurs with a smaller amount from emulsifier.

THE INVENTION

For this purpose according to the invention, the emulsifier amount of equal to 0.5 to 5 weight % from the monomer amount and the degree of substitution of the starch is higher than 0.8 substituted glucose hydroxyl groups per anhydroglucose unit.

In a particular embodiment of the invention, said starch is hydroxypropyl starch and the degree of substitution thereof lies between 0.8 and 1.8 substituted glucose hydroxyl groups per anhydroglucose unit.

In a particular embodiment of the invention, said starch is hydroxyethyl starch and the degree of substitution thereof lies between 0.8 and 2.75 substituted glucose hydroxyl groups per anhydroglucose unit.

In a useful embodiment of the invention, the emulsifier amount is substantially equal to 1 weight % from the monomer amount.

The emulsifier is for example comprised of a mixture from anionic emulsifier and non-ionic emulsifier.

The invention does not only relate to the abovedescribed method but also to the dispersion prepared according to such a method.

Finally the invention further pertains to the protective colloid which is used for the working of the above-defined method and particularly to a protective colloid comprised of hydroxypropyl and/or hydroxyethyl starch with a degree of substitution higher than 0.8 substituted glucose hydroxyl groups per anhydroglucose unit, more particularly with such a degree of substitution that lies between 0.8 and 1.8 when the starch is hydroxypropyl starch and between 0.8 and 2.75 when the starch is hydroxyethyl starch.

Other details and advantages of the invention will stand out from the following description from embodiments of a method for preparing a water-containing vinyl acetate polymer dispersion, from the dispersion thus obtained and from the protective colloid used thereby according to the invention.

DESCRIPTION OF PREFERRED EMBODIMENTS

There is formed with a buffer, an emulsifier and a hydroxypropyl or hydroxyethyl starch or a mixture from both starches as protective colloid, a water phase. There is further worked with a solution from the initiator and naturally also with the monomer vinyl acetate and possibly with the co-monomers.

The water phase is prepared with demineralized water and the amount thereof is dependent on the required content in dry material. The man skilled in the art may easily compute what is the water amount required to obtain in the final dispersion a dry material content from 48 to 65%. For the buffer use can be made of sodium acetate with a proportion from 0.9 to 1.5%. This value and the percentages given hereinbelow pertain to weight amounts relative to the monomer amount.

The total emulsifier amount lies between 0.5 and 5%. Using about 1% emulsifier is enough for homopolymerizing vinyl acetate. The emulsifier is comprised of a mixture from two emulsifiers, namely an anionic emulsifier and a nonionic emulsifier. The anionic emulsifier is for example the sodium salt from nonyl-phenyl-n mol ethylene oxide sulphate

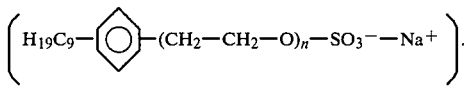

Said non-ionic emulsifier is for example nonyl-phenyl-n mol ethylene oxide

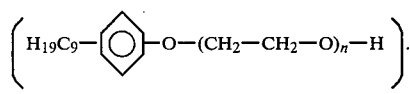

The anionic emulsifier amount lies preferably between 0 and 2%. The non-ionic emulsifier amount lies preferably between 0.30 and 5%.

The purpose of the emulsifier in applications of this kind is known to the man skilled in the art. Monomers little or not soluble in water are dispersed in the water phase due to the action of the emulsifier.

Instead of said emulsifiers, other surface-active materials may be used. The invention application is thus not limited to the use of the above-defined emulsifiers.

The starch derivative amount which is added to the water phase as protective colloid lies between 0.5 and 5% and it is for example 1%. The hydroxypropyl or hydroxyethyl starch may have various base structures and originate for example from corn, rice, wheat, potato, tapioca, corn hybrids such as waxy and high-amylose corn, whether of not enzymatically or hydrolytically decomposed. The degree of substitution (DS) from the substituted starch derivative varies between about 0.8 and about 2.75 substituted glucose hydroxyl groups per anhydroglucose unit. The most suitable degree of substitution is dependent on the nature of the starch skeleton and on the distribution of the substituent over the molecule and it is also selected as a function of the required properties of the starch derivative. Consequently no sharply-defined limit can be determined. The optimum protecting and thickening action of the starch derivatives occurs with a degree of substitution (DS) lying between 0.8 and 1.8 for hydroxypropyl starch and between 0.8 and 2.75 for hydroxyethyl starch. With higher values for the degree of substitution, the advantageous properties are again reduced.

A protective colloid is dissolved with thorough stirring during 10 minutes at 1,500 RPM, in some demineralized water. A 5% solution is for example prepared. The emulsifier and the sodium acetate are also dissolved in water. Both solutions are mixed and demineralized water is added to obtain the required weight, according to the desired content in dry material of the latex.

The homogeneized water phase is then transferred to a thermostated reactor. It is heated under stirring to 71° to 75° C. Monomer and initiator are added. The monomer is added uniformly during a time interval from 2 hours to 4½ hours. After completion, post-heating is performed either during about 1 hour at 90° C., or during about 2 hours at reaction temperature. The monomer which is used thereby may be comprised of vinyl acetate when it is desired to form a latex with a vinyl acetate homopolymer. Said monomer may also be comprised of vinyl acetate and one or more monomers belonging to the series of the unsaturated organic esters, acrylates, methacrylates, alkenes and vinyl derivatives, for example dibutyl maleate, ethyl acrylate and butyl acrylate.

Latexes prepared according to the above generally-defined method with starch derivatives as protective colloids have a good viscosity, a good mechanical stability, a quite high pseudoplastic index, which is of interest for many uses, as well as good behaviour when stored.

The way those starch derivatives which are used for the preparation, are prepared in turn is known to the man skilled in the art.

EXAMPLE 1.

6.25 g (1.16% relative to the monomer) cold-soluble hydroxypropyl starch (degree of substitution 1.3) is dissolved in about 150 ml demineralized water.

7.8 g anionic emulsifier at 100% activity (that is 1.45% relative to the monomer), 15.6 g non-ionic emulsifier at 100% activity (that is 2.9% relative to the monomer) and 5.1 g sodium acetate are dissolved into demineralized water.

Both solutions are mixed and diluted with demineralized water to 510 g (theoretic dry material content being 52.4%).

578 ml vinyl acetate (539.7 g) and a solution from 1 g potassium persulphate in 50 ml water are added during a time interval from 3 to 4 hours.

The temperature is retained constant between 72° and 75° C. After said addition, post-heating is still made during 2 hours at the same temperature.

The formed latex is thereafter cooled down to a temperature of 40° C., whereafter 4 g Proxel CRL 10% (ICI) is added. The latex is finally filtered.

The polyvinyl acetate dispersion thus obtained has a very good structure, a dry material content of 51.1%, a Brookfield's viscosity of 175 cP at 100 RPM (spindle 2) and a pseudo-plastic index of 2.8.

The mechanical stability is very good. After stirring during two hours inside a stainless steel cup at 2,000 RPM, the viscosity increases by a factor 1.65 relative to the original viscosity, that is the viscosity before stirring.

The stability during storage is good. No viscosity changes larger than 10% are noted by storing for a few months.

The chemical stability is normal. The addition of equal volumes from HCl (1 N), calcium chloride (10%), ammonium nitrate (20%), hydrogen chloride or sodium chloride (10%) causes no coagulating or thickening after resting for 18 hours.

The addition of an equal from ammonium hydrogen phosphate (25%) causes directly syneresis and coagulating.

The properties of the prepared latex are comparable to the ones of latexes prepared with Natrosol 250-L (hydroxyethyl cellulose).

EXAMPLE 2.

One operates as in example 1 but with the following amounts: 1.62 g anionic emulsifier at 100% activity (0.3% relative to the monomer), 3.24 g non-ionic emulsifier at 100% activity (0.6% relative to the monomer), 5.1 g sodium acetate and 6.25 g hydroxypropyl starch (degree of substitution 1.36). The total weight of the water phase is 461 g. The theoretical content in dry material is 52.45%.

The formed latex has a good structure; the efficiency is somewhat lower than in example 1, namely the dry material content is 52.25%. The Brookfield's viscosity is 150 cP at 100 RPM (spindle 2).

For the mechanical stability test, the viscosity increases by a factor 1.66. The viscosity during storage is good. In the presence of electrolytes, the latex behaves as described in example 1.

EXAMPLE 3.

(For comparison; preparation of a latex without protective colloid).

One operates as in example 1, but without adding a protective colloid. The total weight of the water phase is 600 g; the theoretical content in dry material is 47.9%.

The reaction mixture is granular during the reaction. The filtered latex is water-thin (viscosity 29 cP at 100 RPM (spindle 1)). The pseudoplastic index is substantially equal to 0.3.

The efficiency of the reaction is clearly lower than when using a starch derivative as protective colloid.

The mechanical stability is also bad.

By comparison with examples 1 and 2, it appears clearly that the starch derivatives of said type with the above-defined degree of substitution, have a protecting emulsifying action.

Some additional examples are given in the following tables, whereby the polymer dispersion is prepared according to one of the following methods:

A first method is similar to the method used in example 1 from U.S. Pat. No. 3,769,248. According to this method, the hydroxyethyl or hydroxypropyl starch is first dissolved in some water. To 130 ml from said solution is added 100 ml from a solution of emulsifier and sodium bicarbonate in water. As emulsifier use is made of ANTAROX CO 630, CO 887 and/or CO 970 from GAF (method A) or of a mixture from ⅓ anionic emulsifier FENOPON CO 433 from GAF and ⅔ ANTAROX CO 630 (method A'). The emulsifier amount is from 10 to 15 g per 100 ml of the solution to be added, while the amount sodium bicarbonate is 0.3 g per 100 ml of the solution to be added. To the mixture of both solutions is now added 30 ml vinyl acetate monomer and thereafter 4 ml from a first initiator and 2 ml from a second initiator. The first initiator is formed by dissolving 0.3 g potassium persulphate in 8 to 10 ml distilled water, and the second initiator is formed by dissolving 0.002 g sodium bisulphite in about 2 ml distilled water. The mixture is then heated to the reaction temperature lying between 72° and 75° C., and thereafter the remainder that is about 230 ml from the vinyl acetate and a further amount from the first initiator, is added dropwise over a time interval from 2.5 to 3 hours. Thereafter the polymer dispersion is cooled down.

According to the second method, called hereinafter method B, there is first dissolved in the water phase but the protective colloid, an emulsifier or an emulsifier mixture, and a buffer, namely sodium acetate. This is heated to a reaction temperature between 72° and 75° C. or even higher, whereafter some solid potassium persulphate is added as initiator. After 10 to 15 minutes, one begins the controlled addition of vinyl acetate monomer and a 2% solution of potassium persulphate, over a time interval from 3 tot 4 hours and at a rate of 12.5 ml per 100 ml monomer.

In the following tables is shown which kind of starch is used and which method is applied.

In these tables:

DS means the degree of substitution given in substituted glucose hydroxyl groups per anhydroglucose unit;

BV is the Brookfield's viscosity in mPa.s;

PPI is the pseudo-plastic index, and dm is the amount dry material in weight %.

The stability is measured with a mechanical stability test in which stirring is performed for two hours at a speed of 2,000 RPM with a standard stirring rod.

| 1st series: .9% emulsifier and 1.2% hydroxypropyl starch. | | | | | | |
|---|---|---|---|---|---|---|
| ex. | kind | A/B | DS | BV at 20 RPM | PPI | dm | stability |
| 4 | waxy | A' | .06 | — | — | — | bad |
| 5 | corn | B | .30 | 45 | .66 | 52.0 | suitable |
| 6 | waxy | A' | 1.10 | 3350 | 2.86 | 51.7 | good |
| 7 | tapioca | B | 1.30 | 130 | 1.59 | 52.0 | good |
| 8 | tapioca | A' | 1.30 | 1300 | 6.45 | 51.6 | good |

The latex according to example 4 granulates during the reaction and appears to be completely dilating, in other words it becomes liquid with fast stirring and more viscous with slow stirring. The latex obtained according to example 6 shows no granulating but has a good mechanical stability. The viscosity decreases during the stability test from 3,350 to 175.

| 2nd. series: 4.35% emulsifier and 1.2 hydroxypropyl starch. | | | | | | |
|---|---|---|---|---|---|---|
| ex. | kind | A/B | DS | BV at 20 RPM | PPI | dm | stability |
| 9 | waxy | B | .12 | 45 | .78 | 47.0 | suitable |
| 10 | waxy | B | .25 | 40 | 1.75 | 51.2 | not particularly |
| 11 | corn | B | .30 | 150 | .79 | 51.2 | good |
| 12 | waxy | B | 1.30 | 350 | 2.43 | 51.2 | very good |
| 13 | tapioca | B | 1.30 | 225 | 2.75 | 51.1 | good |
| 14 | waxy | B | 1.90 | 95 | .86 | 50.8 | good |

The stability of the latex obtained in example 9 is markedly better than the one obtained in the above example 5. With the stirring during the stability test, there occurs a smaller viscosity increase.

The latex obtained according to example 12 was one of the best in the series and had very good stability.

The stability of the latex obtained according to example 14 was worse. The viscosity increased more strongly during the stability test.

| 3rd. series: 10.3% emulsifier and 1.4% hydroxypropyl starch. | | | | | | | |
|---|---|---|---|---|---|---|---|
| ex. | kind | A/B | DS | BV at 20 RPM | PPI | dm | ph | stability |
| 15 | waxy | A | .06 | 1200 | 2.41 | 51.1 | 4.75 | good |
| 16 | corn | A | .30 | 3000 | 4.14 | 51.0 | 5.10 | good |
| 17 | tapioca | A | 1.30 | 2300 | 3.89 | 51.0 | 4.85 | good |

During the stability test the viscosity of the latex obtained according to example 15 increased from 1320 to 1375. For the latex according to example 16 this increase was from 3000 to 5240, while for the latex according to example 17 there was a viscosity increase from 2625 to 1900 during the stability test.

With hydroxyethyl starches having very high degrees of substitution, namely 3.1 and 3.8, very bad, little viscous and dilating latexes having a very bad stability are obtained.

4th. series: Method A' with .9% emulsifier and 1.5% hydroxypropyl starch as protective colloid.

| ex. | DS | BV at 20 RPM | BV at 100 RPM | PPI | dry material theor. | dry material measured | pH | res. monomer | stability |
|---|---|---|---|---|---|---|---|---|---|
| 18 | .1 | water-thin and granular | | | 52.6 | ±30 | 5.1 | — | bad |
| 19 | .25 | 220 | 190 | 1.1 | 52.6 | 52.1 | 5.0 | .60 | quite good |
| 20 | .85 | 1200 | 600 | 2.6 | 52.6 | 51.2 | 5.1 | — | good |
| 21 | 1.0 | 650 | 470 | 1.7 | 52.6 | 52.1 | 5.0 | .53 | good |
| 22 | 1.6 | 1050 | 680 | 1.7 | 52.6 | 52.6 | 5.1 | .40 | good |
| 23 | 2.0 | 160 | 200 | .8 | 52.6 | 52.1 | 4.7 | .62 | good |

The latex obtained according to example 18 was bad, while the latexes obtained according to examples 21 and 22 were very good.

8th. series: Method B with .9% emulsifier (.3% anionic and .6% non-ionic) and 4.5% hydroxyethyl corn starch.

| ex. | DS | BV at 20 RPM | BV at 100 RPM | PPI | dm theor. | dm measured | pH | stability |
|---|---|---|---|---|---|---|---|---|
| 36 | .1 | 260 | 165 | 1.6 | 52.4 | 52.2 | 5.1 | fair |
| 37 | .7 | 300 | 270 | 2.1 | 52.4 | 52.2 | 5.1 | fair |
| 38 | 1.0 | 310 | 280 | 1.3 | 53.4 | 53.2 | 4.9 | good |
| 39 | 1.6 | 6050 | 2520 | 3.4 | 52.4 | 51.0 | 5.0 | good |
| 40 | 2.0 | 4050 | 1850 | 3.3 | 52.4 | 50.0 | 4.9 | very good |
| 41 | 2.7 | 9400 | 4350 | 3.6 | 52.4 | 51.5 | 4.9 | very good |
| 42 | 3.2 | 1000 | 725 | 1.7 | 52.4 | 51.0 | 4.9 | good |

5th. series: Method B with .9% emulsifier (.3% anionic and .6% non-ionic) and 1.2% hydroxypropyl tapioca starch.

| ex. | DS | BV at 20 RPM | BV at 100 RPM | dm PPI | theor. | measured | pH | res. monomer | stability |
|---|---|---|---|---|---|---|---|---|---|
| 24 | .1 | water-thin | | — | 64.9 | 35.4 | 5.1 | .77 | very bad |
| 25 | .9 | 650 | 640 | 1.0 | 64.9 | 64.6 | 5.1 | .50 | good |
| 26 | 1.2 | 750 | 700 | 1.1 | 64.9 | 65.0 | 5.2 | .57 | good |
| 27 | 1.4 | 3900 | 3700 | 1.0 | 64.9 | 64.4 | 5.1 | .33 | rather good |
| 28 | 1.8 | 230 | 275 | .8 | 64.9 | 65.2 | 5.0 | .62 | dilating |

The best latex was obtained according to example 26.

Very good latexes were obtained according to examples 39, 40 and 41.

6th. series: Method B with .9% emulsifier (.3% anionic .6% non-ionic) and 1.2% hydroxypropyl tapioca starch.

| ex. | DS | BV at 20 RPM | BV at 100 RPM | PPI | dm theor. | dm measured | pH | stability |
|---|---|---|---|---|---|---|---|---|
| 29 | .1 | 30 | 50 | .6 | 52.8 | 50.6 | — | bad |
| 30 | .9 | 70 | 145 | 1.45 | 55.6 | 52.2 | 4.9 | good |
| 31 | 1.2 | 100 | 150 | .8 | 52.8 | 51.5 | 4.9 | very good |
| 32 | 1.4 | 100 | 125 | 1.0 | 52.8 | 50.9 | 4.8 | good |
| 33 | 1.8 | 65 | 92 | 1.15 | 52.8 | 52.1 | 5.0 | good |

9th. series: Co-polymerizing of vinyl acetate and dibutyl maleate with a weight ratio of 3/1 according to method B, with 3.8% emulsifier (1.3% anionic and 2.5% non-ionic) and 1% hydroxypropyl corn starch as protective colloid

| ex. | DS | BV at 20 RPM | BV at 100 RPM | PPI | dm theor. | dm measured | pH | stability |
|---|---|---|---|---|---|---|---|---|
| 43 | .2 | 45 | 100 | 2.2 | 50.7 | 50.0 | 4.8 | fair |
| 44 | .6 | 60 | 100 | 1.6 | 50.7 | 49.1 | 4.9 | good |
| 45 | 1.1 | 110 | 120 | 1.1 | 50.7 | 50.1 | 4.8 | good |
| 46 | 1.3 | 110 | 230 | 2.1 | 55 | 53.4 | 5.1 | good |
| 47 | 1.9 | completely granular | | — | — | — | — | bad |

The best latexes were obtained according to the examples 31 and 32.

The latexes obtained according to examples 43 and 44 were fair and the ones obtained according to examples 45 and 46 were good.

7th. series: Method A' with .9% emulsifier and 1.2% hydroxyethyl starch.

| ex. | kind | DS | |
|---|---|---|---|
| 34 | tapioca | 2.75 | with cooling after the reaction, the latex granulates and appears to be dilating. |
| 35 | corn | 2.00 | |

It is clear from these additional examples (4 to 47) that a very good latex can be obtained with small amounts emulsifier but with a degree of substitution higher than 8 and preferably lying between 0.8 to 1.8 for hydroxypropyl starch and between 0.8 and 2.7 for hydroxyethyl starch. With a degree of substitution lower than 0.8 bad results are obtained with small amounts emulsifier. The results can actually be improved by increasing the emulsifier amount.

What we claim:

1. A method for preparing a water-containing vinyl acetate polymer dispersion, comprising adding vinyl acetate monomer and initiator to a water solution from an emulsifier and an amount, between 0.1 and 6 weight % from the monomer amount, of hydroxypropyl and/or hydroxyethyl starch, in which the emulsifier amount is equal to 0.8 to 2.3 weight % from the monomer amount, and the degree of substitution of the starch lies between 0.9 and 1.6 hydroxypropyl groups per anhydroglucose unit for the hydroxypropyl starch and between 0.9 and 2.7 hydroxyethyl groups per anhydroglucose unit for the hydroxyethyl starch.

2. A method as defined in claim 22, in which at least one other monomer belonging to the series of the unsaturated organic esters, acrylates, methacrylates, alkenes and vinyl derivatives is incorporated in the water phase together with said vinyl acetate monomer.

3. A method as defined in claim 1, in which said emulsifier is comprised of a mixture from anionic emulsifier and non-ionic emulsifier.

4. A method as defined in claim 3, in which the anionic emulsifier amount is equal to 0 to 2 weight % from the monomer amount and the non-ionic emulsifier amount is equal to 0.3 to 2.3 weight % from the monomer amount.

5. A method as defined in claim 1, in which the protective colloid amount is substantially equal to 1 weight % from the monomer amount.

* * * * *